(No Model.)
F. W. CUSHING.
MEANS FOR MEASURING VELOCITIES BY ELECTRICITY.
No. 293,426. Patented Feb. 12, 1884.
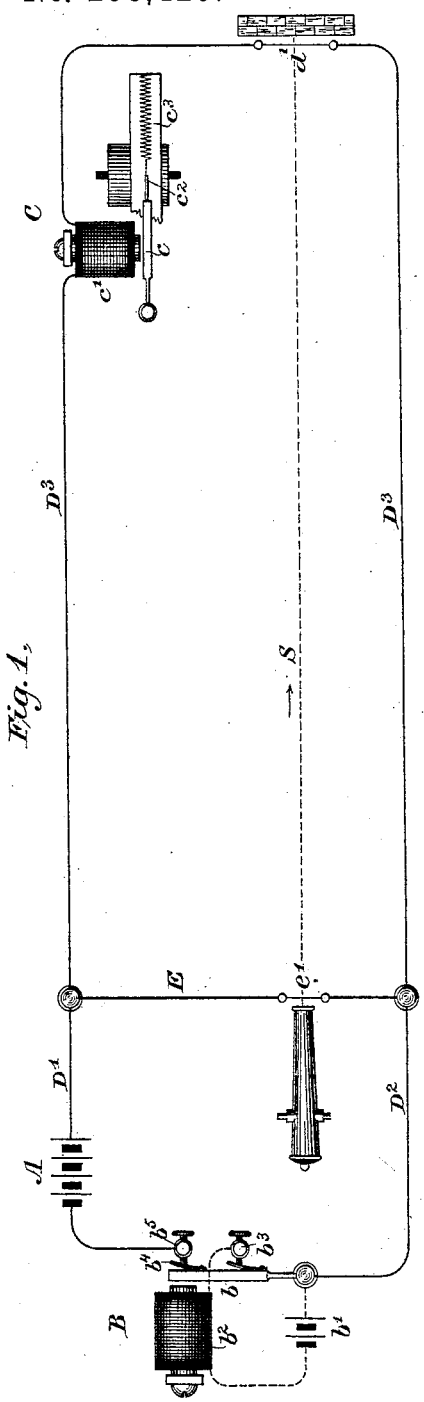
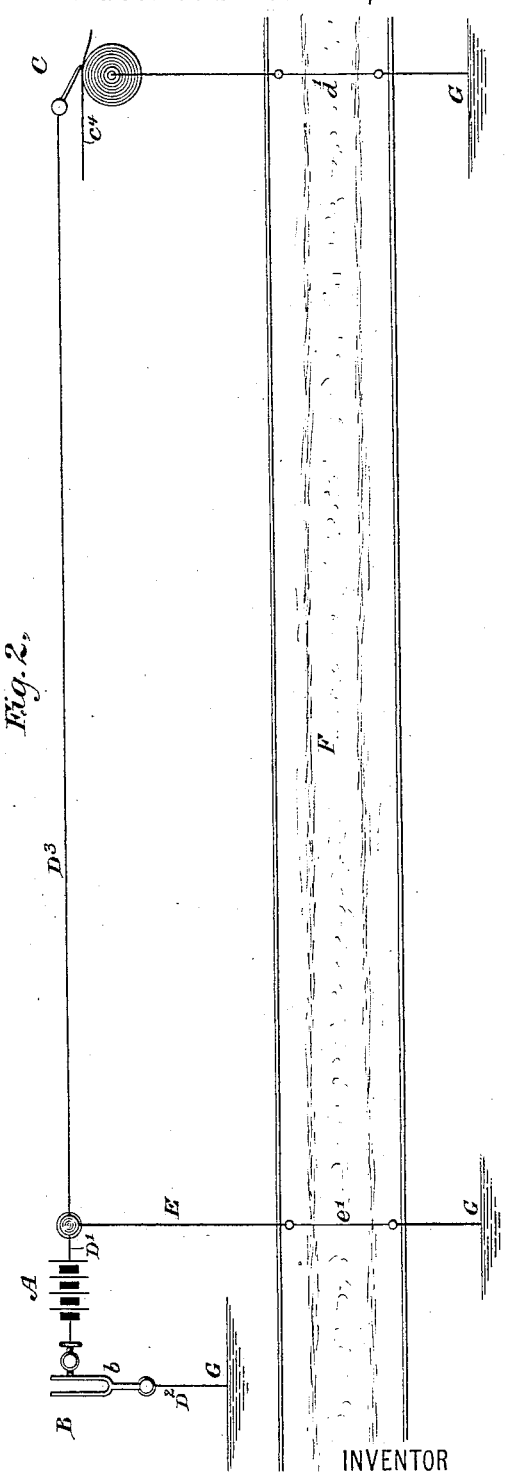
WITNESSES
Wm A. Skinkle
Geo. W. Breck
INVENTOR
Frederick W. Cushing,
By his Attorneys
Pope Edgecomb & Butler.

UNITED STATES PATENT OFFICE.

FREDERICK W. CUSHING, OF NEW YORK, N. Y.

MEANS FOR MEASURING VELOCITIES BY ELECTRICITY.

SPECIFICATION forming part of Letters Patent No. 293,426, dated February 12, 1884.

Application filed July 20, 1883. (No model.)

*To all whom it may concern:*

Be it known that I, FREDERICK W. CUSHING, a citizen of the United States, residing in the city, county, and State of New York, have invented certain new and useful Improvements in Means for Measuring Velocities by Electricity, of which the following is a specification.

My invention relates to means for determining and recording the interval of time occupied by a moving body in passing from one point to another.

It consists in a method of and organization of devices for recording such interval of time.

My invention is particularly useful in determining precisely the velocities of objects moving at high rates of speed—as, for example, projectiles, race-horses, &c.

In brief, the method and the appliances involved in my invention may be described as follows: The force of the moving body is employed to cause the rupture of certain electrical circuits at points separated by a known distance. The circuit that is first broken may be described as a shunt of low resistance spanning a battery and rheotome. That subsequently broken may be considered as the main circuit, which includes said battery, said rheotome, and a recording device actuated by said battery and rheotome.

The manner of operation is as follows: The moving projectile or other body first severs the shunt-circuit, thereby throwing the full force of the current through the entire main circuit and setting the recording device in operation. It next cuts the main, thereby arresting the action of said recording device. The record produced by the recorder shows the number of rheotome vibrations and fractions of vibrations that took place while the body was passing from the point at which it opened the shunt to the point at which it opened the main. This distance being accurately predetermined, and the rate of vibration of the rheotome being also known, it is a matter of simple calculation to determine the velocity of the moving body. For a rheotome I prefer to use a reed or tuning-fork having a constant rate of vibration, and maintained in action either by means of a local battery or, where the time to be measured is sufficiently short, by virtue of its elasticity unaided. For the recording device a similar vibrating reed may be used, producing a linear record upon a suitable receiving-slip of each pulsation of current established by the battery and rheotome; or the currents may be passed through a traveling slip of paper or other convenient medium moistened with one of the well-known electrolytic agents, which change color under the decomposing action of the current. The manner in which the said circuits are broken by the action of the moving body is immaterial, so long as it is instantaneous, and offers but an inappreciable resistance to the progress of said body. Moreover, devices for accomplishing this purpose are well known to those versed in the art. The shunt-circuit may, for example, include a short copper wire of fine caliber, readily broken by pressure; or it may be so arranged as to be easily disconnected at its point of union with the main line. Similarly, the main line may include a section which can be easily fractured, or two electrodes normally in contact, but which can be separated by slight pressure. The particular subject-matter claimed will be hereinafter specifically designated.

My invention is set forth in the accompanying drawings, in which Figure 1 is a general diagram of the invention as applied to the measurement of the velocity of a moving projectile; and Fig. 2 shows the invention as applied to a horse-racing track, with equivalent forms of rheotomes and recording devices substituted for those appearing in Fig. 1.

Similar letters of reference are applied to corresponding parts appearing in both figures.

Referring to these figures, A, B, and C are respectively a battery, a rheotome, and a recording device. These devices are included in the course of the main circuit $D'$ $D^2$ $D^3$. A shunt-circuit, E, of low resistance, spans the rheotome and battery in the manner shown.

In Fig. 1 the rheotome consists of a reed, $b$, which may be set in vibration mechanically, and maintained in vibration by means of a local battery, $b'$, a magnet, $b^2$, and circuit-breaking device $b^3$. The main-line connection is made between a contact-blade, $b^4$, and the stop $b^5$, whereby with every engagement of said contact-blade and stop $a$ pulsation from the battery A is established upon the wires, the major part traversing the route $D'$ E $D^2$. The shunt-circuit E should be of such low resistance as to divert enough of the main current to prevent the actuation of the recording device C. In Fig. 1 this latter instrument consists of a vibrating reed, $c$, (preferably tuned to accord with the reed $b$,) and a magnet, $c'$, included in the main circuit, for actuating the reed $c$ and maintaining it in vibration so long as currents of sufficient strength traverse said main circuit $D'$ $D^2$ $D^3$. Further, the reed $c$ carries the stylus $c^2$, which rests upon the traveling slip of paper $c^3$, and under the action of the magnet $c'$ records the pulsations, as shown. The portions $e'$ and $d'$ of the shunt and main circuits, respectively, are both located in the path of the moving projectile or other body, and are capable of each fracture.

The manner of operation is as follows: The reed $b$ being in vibration, the projectile, following the course of the dotted line S in the direction indicated by the arrow, will, on breaking the shunt at $e'$, set the recording mechanism into operation, and, on breaking the main at $d'$, arrest the action of said recording mechanism. The rate of vibration of the reed $b$ being known—as, for example, one hundred vibrations per second—the distance between the points $e'$ and $d'$ being also known—as, for example, one mile—the number of vibrations recorded—as, for example, seven hundred and fifty-six—will show the velocity to have been a mile in 7.56 seconds.

In Fig. 2, F represents a racing-track. The reed $b$ is replaced by a tuning-fork, which, for such use, may have a slow rate of vibration, and the vibrating recorder C is replaced by a device for producing the record by the well-known electrolytic process. Each pulsation of electricity, in traversing the moving slip $c^4$ of chemically-prepared paper, produces a discoloration due to the decomposition of the solution contained in its pores, in a manner familiar to those versed in the art.

I claim as my invention—

1. The herein-described method of operating a time-recording device, which consists in first opening a shunt-circuit spanning the devices which actuate said recording device, and, secondly, in breaking the main circuit in which said recording device and the devices which actuate it are included.

2. The combination, substantially as hereinbefore set forth, of a battery, a rheotome, a recording device included in the main circuit of said battery, and actuated by the pulsatory currents established by the action of said rheotome, and a shunt-circuit spanning said battery and rheotome, which normally prevents the action of said recording device.

3. The combination, substantially as hereinbefore set forth, of the battery, means for rendering its current pulsatory, the main circuit, means for shunting off the greater portion of the pulsatory current from said main circuit, and means for recording the pulsations traversing said main circuit whenever said shunt is broken.

4. The combination, substantially as hereinbefore set forth, of a main circuit, including a rheotome, a battery, and a recording device, and a shunt-circuit normally shunting said battery and said rheotome.

5. The combination, substantially as hereinbefore set forth, of a rheotome, a battery, and a chemical recording device included in a main circuit, and a shunt-circuit for preventing the operation of said recording device.

6. The combination, substantially as hereinbefore set forth, of the shunt-circuit, the main circuit, including the battery, rheotome, and recorder, and means whereby said shunt and main circuits are successively opened by the passage of a moving body.

In testimony whereof I have hereunto subscribed my name this 29th day of June, A. D. 1883.

FREDERICK W. CUSHING.

Witnesses:
DANIEL W. EDGECOMB,
CARRIE E. DAVIDSON.